(12) United States Patent
Horner et al.

(10) Patent No.: US 11,919,577 B2
(45) Date of Patent: *Mar. 5, 2024

(54) BED SIDE GATE

(71) Applicant: Magna Exteriors Inc., Concord (CA)

(72) Inventors: Robert M. Horner, Ferndale, MI (US); Larry R. Erickson, Birmingham, MI (US)

(73) Assignee: Magna Exteriors Inc., Concord (CA)

( * ) Notice: Subject to any disclaimer, the term of this patent is extended or adjusted under 35 U.S.C. 154(b) by 76 days.

This patent is subject to a terminal disclaimer.

(21) Appl. No.: 17/365,648

(22) Filed: Jul. 1, 2021

(65) Prior Publication Data

US 2022/0001939 A1 Jan. 6, 2022

Related U.S. Application Data

(60) Provisional application No. 63/047,510, filed on Jul. 2, 2020.

(51) Int. Cl.
*B62D 33/037* (2006.01)
*B62D 33/027* (2006.01)

(52) U.S. Cl.
CPC ......... *B62D 33/037* (2013.01); *B62D 33/027* (2013.01)

(58) Field of Classification Search
CPC .. B62D 33/023; B62D 33/027; B62D 33/037; B60J 5/0497
See application file for complete search history.

(56) References Cited

U.S. PATENT DOCUMENTS

| 4,861,096 | A | * | 8/1989 | Hastings | B60J 5/0497 296/183.1 |
|---|---|---|---|---|---|
| 6,030,018 | A | * | 2/2000 | Clare | B60J 10/24 224/404 |
| 7,686,365 | B2 | * | 3/2010 | Thelen | B60R 9/00 296/181.3 |
| 9,027,984 | B2 | * | 5/2015 | Bates | B60J 5/0476 296/186.4 |
| 9,511,803 | B2 | * | 12/2016 | Wassell | B60P 1/02 |
| 2006/0119134 | A1 | * | 6/2006 | Dean | B62D 33/0273 296/182.1 |
| 2009/0127886 | A1 | * | 5/2009 | Stortzum | B60J 5/0497 296/146.1 |
| 2018/0079455 | A1 | * | 3/2018 | Jaradi | B62D 33/037 |
| 2019/0023330 | A1 | * | 1/2019 | McKinney | B62D 33/023 |
| 2019/0329713 | A1 | * | 10/2019 | Sharma | B62D 33/023 |
| 2022/0001939 | A1 | * | 1/2022 | Horner | B62D 33/037 |
| 2022/0119045 | A1 | * | 4/2022 | Horner | B62D 33/027 |

* cited by examiner

*Primary Examiner* — Gregory A Blankenship
(74) *Attorney, Agent, or Firm* — Warn Partners, P.C.

(57) ABSTRACT

An access door for a vehicle including an open bed assembly including a front wall, two side walls and a rear wall. A door portion on one of the side walls of the liftgate opening on a substantially vertical hinged axis for providing side access to the truck bed.

5 Claims, 1 Drawing Sheet

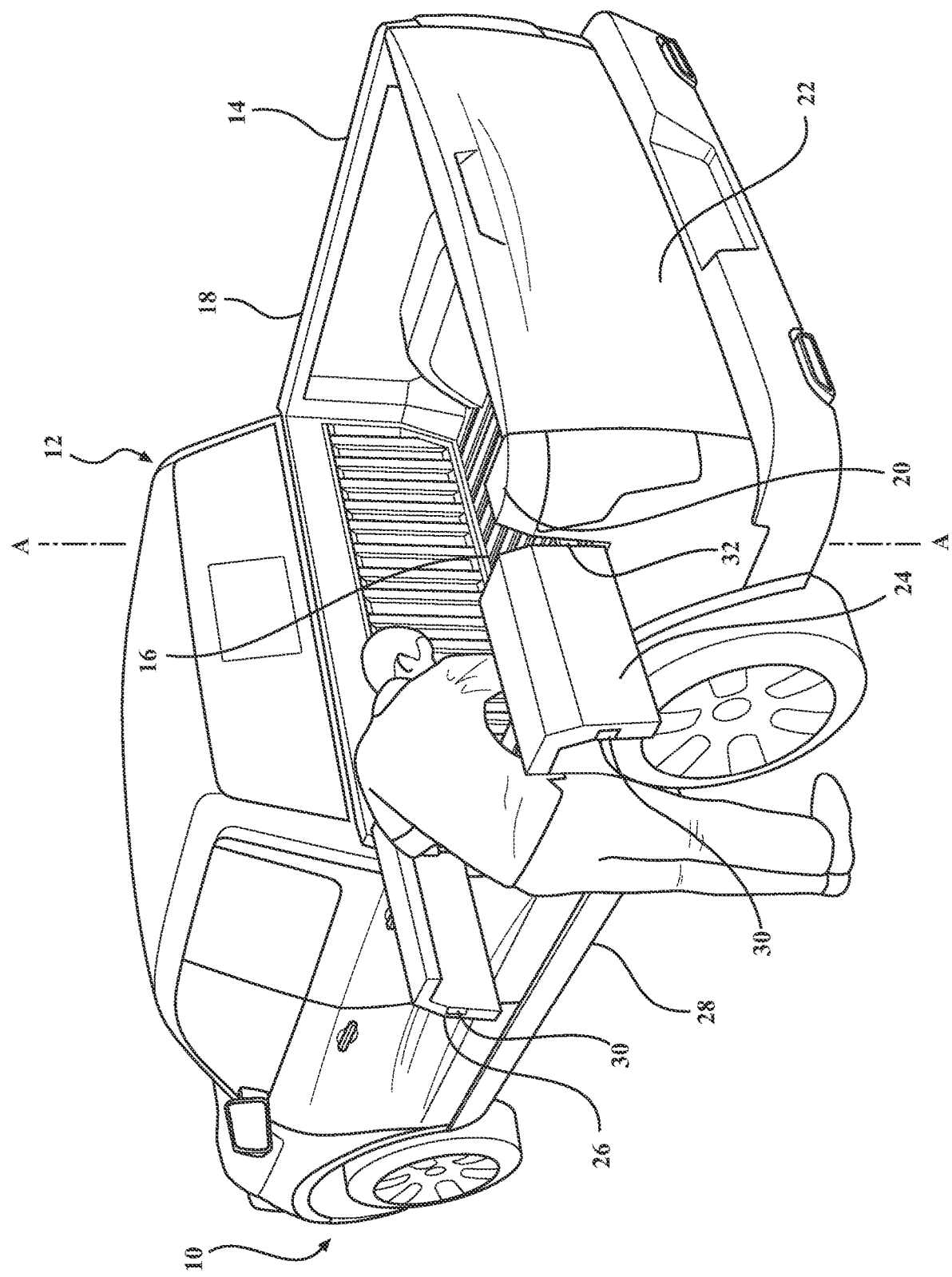

BED SIDE GATE

CROSS-REFERENCE TO RELATED APPLICATIONS

This application claims the benefit of U.S. Provisional Application Ser. No. 63/047,510, filed Jul. 2, 2020. The disclosure of the above application is incorporated herein by reference.

FIELD OF THE INVENTION

The present invention relates to side access for a pickup truck bed.

BACKGROUND OF THE INVENTION

Pickup trucks have become increasingly popular for today's consumers. These trucks range from work trucks to deluxe urban models but all of them have one thing in common, a pickup truck bed. Beds range from small 4 foot best up to 8 foot long beds. The pickup truck beds are offered with a single fold down rear bed gate to provide access to the entire bed of the truck. While the rear access gate allows some access to contents in the rear of the vehicle, items in the front of the bed and front sides are very hard to reach even though the beds are typically only 4-6 feet wide. Reaching items or placing items in the front of a pickup bed interior.

Therefore, it is a goal in the art to provide better access to the front of a pickup bed interior without climbing into the bed or necessity of a step or other climbing features.

SUMMARY OF THE INVENTION

An access door for a vehicle including an open bed assembly including a front wall, two side walls and a rear wall. A door portion on one of the side walls of the liftgate opening on a substantially vertical hinged axis for providing side access to the truck bed.

A door is incorporated into the bed side that allows the user to reach the areas of the pickup bed interior formally beyond their reach.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of an access door for a truck bed in accordance with the teachings of the present invention.

DETAILED DESCRIPTION OF THE PREFERRED EMBODIMENTS

The following description of the preferred embodiment(s) is merely exemplary in nature and is in no way intended to limit the invention, its application, or uses.

A door located on the side of the pickup bed that opens outward is made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

An access door generally shown at 10 for a vehicle 12 is provided by the present invention. An open bed assembly 14 includes a front wall 16, two side walls 18, 20 and a rear wall 22.

The vehicle 12 is a typical pickup truck vehicle as are known and popular in motor vehicles today. Other vehicles with a vertical side may likewise utilize the present invention. At least one door portion 24 on one of the side walls 20 or 18 of the liftgate opening is provided to provide access to the interior area of the truck bed 14. The door 24 is hinged for opening on a substantially vertical hinged axis A-A for providing side access to the truck bed 14. Preferably two doors 24, 26 are provided. Doors 24 and 26 open on a vertical hinged access and meet in a middle area 28 of the side truck bed wall 20. The hinges 30 for the doors are near the front end 16 and rear end 22 of the bed 14. A latching mechanism 32 is provided for holding the doors closed or allowing them to swing outward for access to the interior of truck bed 14. In an alternate embodiment, doors are provided on both sides of the truck gate.

The doors 24 and 26 located on the side of the pickup bed are made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An access door for a pickup truck type vehicle including a truck bed assembly including a rear wheel well, a front wall, two side truck bed walls a truck bed floor and a rear wall forming an interior comprising:
   an access door portion positioned for opening above the wheel well on an upper portion of at least one of the side truck bed walls and opening above the bed floor and said access door being positioned between the front wall and the rear wall of one of the side truck bed walls of the truck bed assembly, said access door opening on a substantially vertical hinged axis for providing side access to the truck bed wherein the access door further comprises two doors opening on a vertical hinged access for opening the door in a longitudinal direction, and meeting in a middle area of said one of the side truck bed wall; and
   a latch in said middle area for holding the doors closed and releasing the doors for opening the doors to provide access into the interior of the truck bed.

2. The access door of claim 1 wherein the hinges are near a front end and a rear end of the open bed assembly.

3. The access door of claim 1 wherein doors are provided on both sides of the open bed assembly.

4. The access door of claim 1 wherein an outer surface of the door is a show surface contour and paint matching surface of the vehicle.

5. The access door of claim 1 wherein an inner door surface matches a surface on the interior of the open bed assembly.

\* \* \* \* \*